Sept. 29, 1942.　　　　S. P. NIXDORFF　　　　2,297,364
ELECTRIC VALVE CONVERTING SYSTEM AND EXCITATION APPARATUS THEREFOR
Filed Oct. 26, 1939　　　3 Sheets-Sheet 1
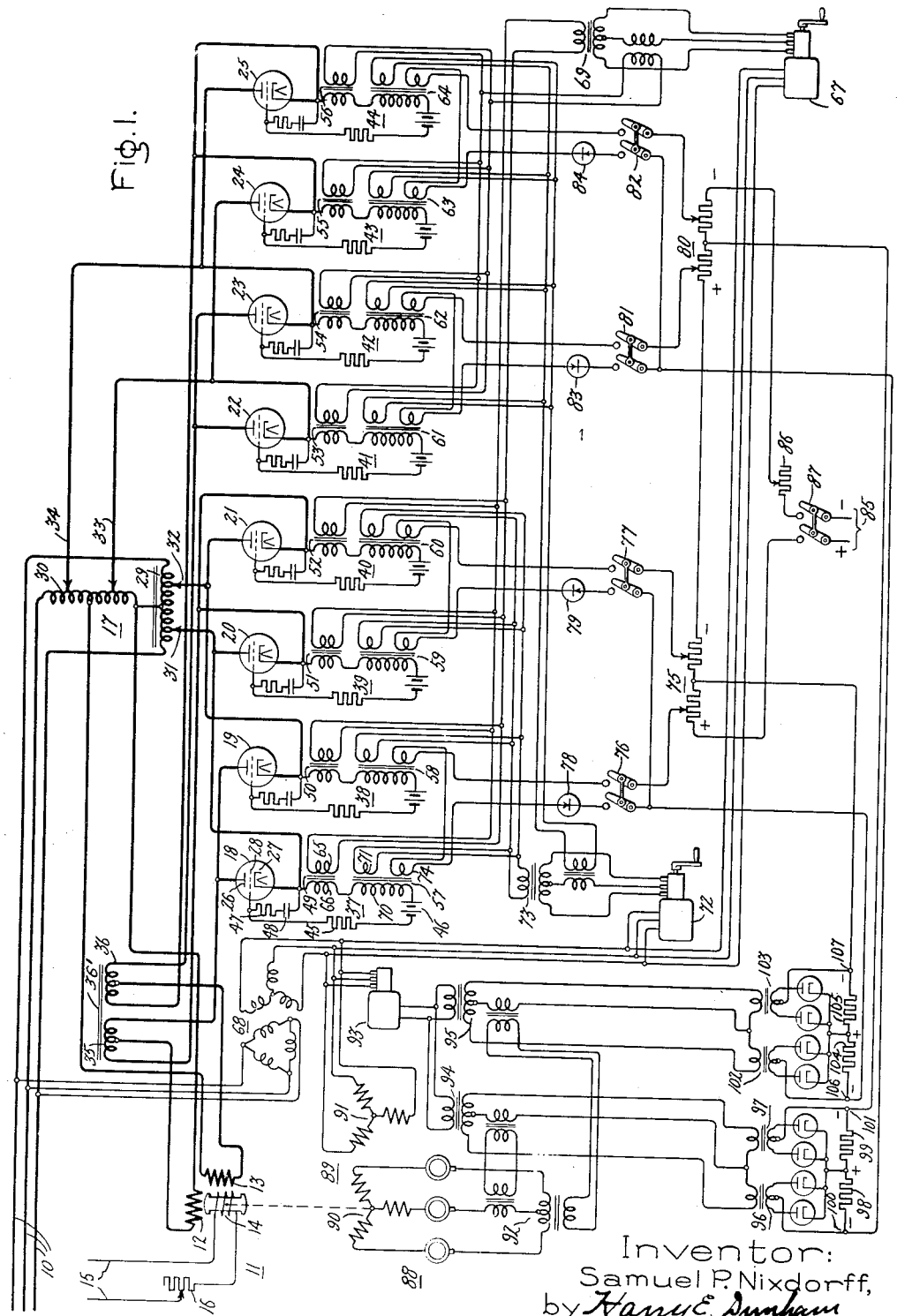
Inventor:
Samuel P. Nixdorff,
by Harry E. Dunham
His Attorney.

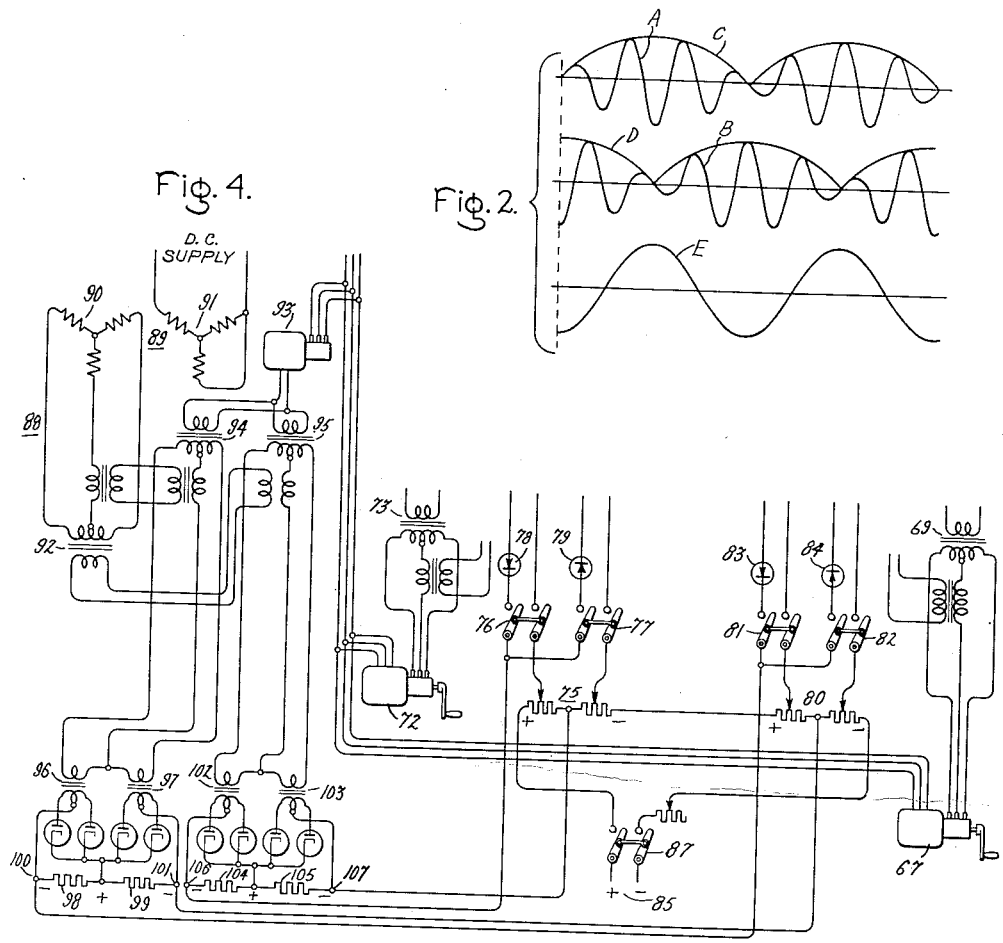

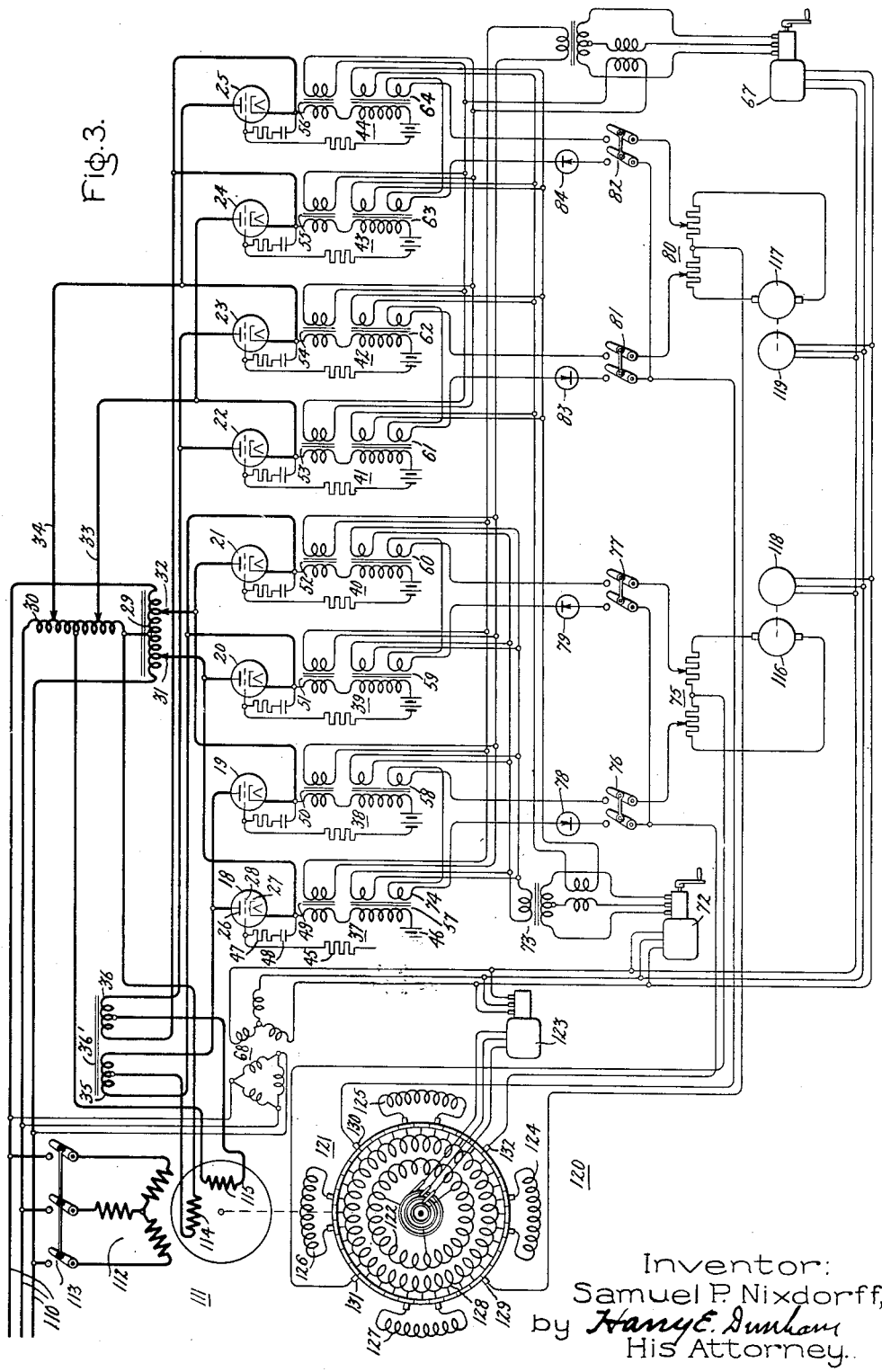

Patented Sept. 29, 1942

2,297,364

UNITED STATES PATENT OFFICE 2,297,364

ELECTRIC VALVE CONVERTING SYSTEM AND EXCITATION APPARATUS THEREFOR

Samuel P. Nixdorff, Schenectady, N. Y., assignor to General Electric Company, a corporation of New York Application October 26, 1939, Serial No. 301,421

13 Claims. (Cl. 172—274)

My invention relates to electric valve converting systems and more particularly to new and improved apparatus for exciting the control elements of the electric valves of such converting systems.

Heretofore there have been devised numerous electric valve converting systems for transmitting electrical energy between direct and alternating current circuits, direct current circuits of different voltages, or independent alternating current circuits of the same or different frequencies. Many of these systems have included distributor apparatus effective to render conductive the several electric valves in a predetermined sequence to transfer the current between the several terminals of the load circuit of the system. In many cases, however, it is desirable to eliminate the moving contacts and other disadvantages inherent in a mechanical distributing apparatus. My invention relates more particular to an excitation apparatus which may replace the conventional mechanical distributor in the arrangements of the prior art and which eliminates commutation difficulties by virtue of a new and improved control circuit.

It is an object of my invention, therefore, to provide an improved electric valve converting system and an excitation apparatus therefor which will overcome the disadvantages inherent in the mechanical distributor apparatus of the prior art and which will be simple and reliable in operation.

It is another object of my invention to provide a new and improved electric valve converting apparatus.

It is a further object of my invention to provide an improved electric valve converting system and an excitation apparatus therefor which will render conductive the several valves in a predetermined sequence and which will eliminate all moving contacts.

A still further object of my invention is to provide an improved variable frequency electric valve converting system having improved power factor and stable operating characteristics.

Still another object of my invention is to provide a variable frequency electric valve converting system in which the frequencies of the system are controlled in accordance with an electrical condition of the output circuit and in accordance with an electrical condition of the input circuit.

It is another object of my invention to provide a new and improved electric valve converting apparatus in which the short circuits or cross currents between electric discharge valves are substantially eliminated and wherein commutation from one valve to another occurs in proper sequence.

In accordance with one embodiment of my invention I provide an electric valve system for operating a dynamo-electric machine of the synchronous type. The system includes a magnetic commutator comprising an alternating current machine or pilot generator which may be direct connected to the rotor of the dynamo-electric machine for generating an alternating voltage, the frequency of which varies directly with an electrical quantity of the dynamo electric machine. The stator of the pilot generator or auxiliary alternating current machine is energized with alternating current from the input circuit to the main dynamo electric machine and the output of the rotor winding of the pilot generator, which has a frequency proportional to the slip frequency of the machine, is superimposed upon the alternating potential of the input circuit so as to obtain a beat frequency. The term slip frequency as used in connection with the electric valve circuit including a main synchronous type dynamo-electric machine denotes the difference between the supply line frequency and the frequency of the alternating current potential applied to the windings of the synchronous machine through the electric valve translating apparatus. These superimposed alternating current frequencies are rectified in such a manner as to produce an alternating potential of the beat frequency which is also the frequency of rotation of the dynamo electric machine. The electric valves are provided with both rectifier and inverter excitation of the periodicity of the supply circuit through peaking transformers and the beat frequency obtained from the magnetic commutator is used to allow the rectifier peaks to come on during certain intervals so as to control the proper energization of the electric discharge valves, the rectifier peaks being held off by a D. C. saturating current on the peaking transformer, of the control circuit.

According to another feature of my invention I provide an electric valve system for operating a dynamo-electric machine of the induction type within a range of speeds extending from sub-synchronous operation to over-synchronous operation and a control system very similar to the control system used in connection with the above described synchronous type dynamo-electric machine is provided for obtaining the specified operation of this motor.

The novel features which I believe to be characteristic of my invention are set forth with particularity in the appended claims. My invention itself, however, will best be understood by reference to the following description taken in connection with the accompanying drawings in which Fig. 1 is a diagrammatic representation of an electric valve converting apparatus embodying my invention applied to a synchronous type of dynamo-electric machine; Fig. 2 represents certain operating conditions of the apparatus illustrated in Fig. 1; Fig. 3 illustrates an embodiment of my invention as applied to an induction type of dynamo-electric machine; and Fig. 4 is a modification of the arrangement illustrated in Fig. 3.

Referring now to Fig. 1, I have illustrated therein an electric valve converting apparatus for transmitting energy between alternating current supply circuit 10 and a variable frequency load circuit comprising a dynamo-electric machine 11. Although my invention is applicable to any of the electric valve converting systems well known in the art regardless of the number of phases of the load and supply circuits, for simplicity of disclosure and explanation I have illustrated an arrangement wherein a quarter-phase dynamo-electric machine 11 of the synchronous type is supplied with electrical energy from a three-phase alternating current source 10. Dynamo-electric machine 11 is illustrated as having an armature winding comprising a plurality of phases 12 and 13, respectively, and a field winding 14 which is energized from any suitable source of direct current 15 through a variable resistor 16. Variable frequency load circuit comprising dynamo-electric machine 11 is connected to alternating current supply circuit 10 by means of a transformer 17 and a plurality of groups of electric discharge valves 18–25, inclusive. Electric discharge valves 18–25 may be any of the several types well known in the art and may comprise a plurality of multi-anode, single cathode discharge devices, or as illustrated in the drawings, they may comprise a plurality of single anode, single cathode valves. Electric discharge valves 18–25, inclusive, are each provided with an anode 26, a cathode 27 and a control electrode or grid 28.

To control the magnitude of the voltage impressed on the phase windings 12 and 13 of dynamo-electric machine 11 and hence to control an operating condition of the dynamo-electric machine 11, there is provided a suitable arrangement comprising transformer 17 which is illustrated as a T-connected autotransformer, the three terminals of which are connected to alternating current supply circuit 10. This autotransformer comprises two windings 29 and 30, respectively, connected in T relation. Winding 29 of T-connected autotransformer 17 is provided with controllable or adjustable contact making mechanisms 31 and 32, whereas winding 30 is provided with adjustable contact making mechanisms 33 and 34, respectively. It will be apparent to those skilled in the art that T-connected autotransformer 17 may be replaced by any other suitable type of static or dynamic electric power conversion apparatus or adjustable potential phase transformation means. The midpoint of winding 29 of T-connected autotransformer 17 is connected to one terminal of phase winding 12, while the midpoint of winding 30 of T-connected autotransformer 17 is connected to one terminal of phase winding 13. The other terminal of phase winding 12 is connected to the midpoint of reactor 35, the purpose of which will be hereinafter described, while correspondingly the other terminal of phase winding 13 is connected to the midpoint of reactor 36. As illustrated in Fig. 1, reactors 35 and 36 are mounted on a common core 36'. The left-hand terminals of reactors 35 and 36 are connected to the cathodes 27 of electric discharge valves 20, 21 and 24, 25, respectively, while the right-hand terminals of reactors 35 and 36, respectively, are connected to the anodes 26 of electric discharge valves 18, 19 and 22, 23. The cathode 27 of electric valve 18 and the anode 26 of electric valve 20 are connected to adjustable contact making mechanism 31, while the cathode 27 of electric discharge valve 19 and the anode 26 of electric discharge valve 21 are connected to adjustable contact making mechanism 32. Similarly, the cathode 27 of electric discharge valve 22 and the anode 26 of electric discharge valve 24 are connected to adjustable contact making mechanism 33, while the cathode 27 of electric discharge valve 23 and the anode 26 of electric discharge valve 25 are connected to contact making mechanism 34. It will be observed from the above described circuit that regardless of the direction of current flowing in phase windings 12 and 13, the flow of current through the right and left portions of reactors or inductive impedance devices 35 and 36 will always be from left to right and hence the flux produced in core 36' by virtue of this current will always be induced in a single direction regardless of the direction of energy flow. Therefore inductive impedance devices or reactors 35 and 36 afford little or no impedance to the normal flow of electrical energy in phase windings 12 and 13, but afford a very high impedance to short circuit currents or cross currents between electric discharge valves 18, 20; 19, 21; 22, 24; or 23, 25, so as not to add to the total reactance of the quarter-phase windings 12 and 13 of dynamo-electric machine 11. This arrangement of reactors is not my invention but is described and broadly claimed in copending application, Serial No. 332,509, filed April 30, 1940, now Pat. 2,264,854, December 2, 1941, upon an application of Albert H. Mittag, and assigned to the assignee of the present application. This application is a continuation-in-part of Mittag application, Serial No. 193,894, filed March 4, 1938.

In order to control the energy transmitted between alternating current circuit 10 and dynamo-electric machine 11, there are provided for the electric discharge valves a plurality of excitation circuits 37–44, respectively, each including one of the grids 28 associated with electric discharge valves 18–25, respectively. By means of the excitation circuits the control electrodes or grids 28 of electric discharge valves 18–25, respectively, are connected to their cathodes 27 through current limiting resistors 45, negative bias battery 46 and appropriate windings of grid transformers which will be described in more detail hereinafter. In order to eliminate undesirable high frequency oscillations I provide resistor 47 and capacitor 48 connected in series relation across the grid to cathode circuits of electric discharge valves 18–25.

In order to control the electric valve converting system to produce the objects noted above there are provided in the excitation circuits 37–44, respectively, a plurality of control transformers 49–56, inclusive, to provide inverter excitation for the groups of electric valves 18–25 and a group of control transformers 57–64, inclusive, to provide rectifier excitation for these discharge paths. Both the rectifier and inverter excitation are of the frequency of the supply circuit 10 and as is well understood by those skilled in the art the inverter peaks lag the rectifier peaks; the phase displacement being provided by phase shifters 67 and 72. Each of the control transformers 49–56, inclusive, is provided with windings 65 and 66. The secondary windings 66 are the output windings which are connected in the grid to cathode circuits of electric discharge valves 18–25, inclusive. The windings 65 are the primary windings of the control transformers and are energized from the alternating current supply circuit 10 through any suitable phase shifting arrangement such for example, as rotary phase shifting transformer 67, and transformers 68 and 69. Transformer 69 comprises a T-connected transformer in order to convert the three-phase control potentials to quarter-phase potentials in view of the quarter-phase windings on dynamo-electric machine 11. It will, of course, be understood by those skilled in the art that transformer 69 could be eliminated if dynamo-electric machine 11 were a three-phase machine instead of the quarter-phase arrangement illustrated. It will be observed that the connections to primary windings 65 are so arranged that the grids 28 of valves 18 and 20 are energized 180 electrical degrees out of phase with respect to the grids of valves 19 and 21 and the grids of valves 22 and 24 are energized 180 electrical degrees out of phase with respect to the grids 28 of valves 23 and 25.

Similarly, the rectifier excitation transformers 57–64, inclusive, are provided with secondary or output windings 70 connected in series with the control electrodes or grids 28 in the respective grid to cathode circuits and primary windings 71 which are the excitation windings energized from the alternating current supply circuit through a suitable phase adjusting means such as rotary phase shifting transformer 72, and transformers 68 and 73, respectively, the latter being a T-connected transformer for converting the three-phase control potentials to quarter-phase control potentials. It will be observed that the rectifier excitation on valves 18, 20, 22, and 25 will be 180 electrical degrees out of phase with respect to the excitation on the next adjacent discharge valves 19, 21, 22 and 23, respectively. In order to prevent a simultaneous flow of current of more than a predetermined magnitude in more than one group of electric valves, which would tend to become a short circuit on one or both of the supply and load circuits, there is provided a means for removing the rectifier excitation from all of the electric discharge valves except the particular ones which transmit energy from supply circuit 10 to dynamo-electric machine 11. This means comprises the windings 74 which are saturating windings continually energized with direct current for removing the rectifier excitation and which are periodically energized with alternating potentials of the frequency of rotation of dynamo-electric machine 11 for overcoming the saturation obtained from the direct current energization allowing the rectifier excitation to become effective. Each of the control transformers 49–64, inclusive, is preferably of the self saturating type so that it will become saturated by the energization of the exciting or primary windings 65 or 71, respectively. The result is that alternating potentials of a peaked wave form are impressed upon the grids of control electrodes 28 of the several electric discharge valves 18–25. As has been mentioned above the control transformers 57–64 are also designed to become saturated by predetermined currents in another of the exciting windings.

In the arrangement illustrated in Fig. 1 the rectifier peaks tend to be wiped out all the time and the output of a magnetic commutator, as will be described hereinafter, allows these peaks to become effective periodically in accordance with the rotating speed of dynamo-electric machine 11. The saturating windings 74, associated with the excitation circuits 37–40, inclusive, which control the energization of phase winding 12, are serially connected and are energized with direct current obtained across potentiometer 75 through switching means 76 and 77. Unilaterally conductive devices 78 and 79 are provided in series with these saturating windings the purpose of which will become apparent as this description proceeds. Similarly, the saturating windings 74, associated with excitation circuits 41–44, inclusive, which control the energization of phase winding 13, are serially connected and energized with direct current obtained across potentiometer 80 through switching means 81 and 82. Unilaterally conductive devices 83 and 84 are provided in series with saturating winding 74 associated with excitation circuits 41–44, inclusive. Potentiometers 75 and 80 may be energized from any suitable source of direct current and in the arrangement illustrated in Fig. 1 I have provided a source of direct current 85 arranged so as to energize potentiometers 75 and 80 through a variable resistance 86 and switching means 87. By means of potentiometers 75 and 80 and variable resistance 86 the saturation of rectifier excitation transformers 57 to 64 may be controlled so that the saturation may be periodically removed from the transformers associated with certain groups of valves in accordance with the output of the magnetic commutator 88, as will be hereinafter described.

In order to maintain the field winding 14 of dynamo-electric machine 11 in torque producing relation with armature phase windings 12 and 13 magnetic commutator 88 is provided for periodically allowing the rectifier excitation of the respective valves 18–25 to become effective. In other words, the magnetic commutator provides means for periodically overcoming the saturating effect of windings 74. Magnetic commutator 88 serves substantially the same purpose as the mechanical distributor of the prior art and comprises a pilot generator 89, the rotor 90 of which is driven at the speed of dynamo-electric machine 11 and is illustrated as mechanically coupled therewith. The stator 91 of pilot generator 89 is energized with alternating current from three-phase alternating current source 10 through transformer 68. The output of the rotor 90 of pilot generator 89 is, as will be understood by those skilled in the art, an alternating current having a frequency equal to the slip frequency of the system, or in other words, the difference between the frequency of the potential of the supply line 10 and the frequency of the potential supplied to the windings of dynamo-electric machine 11. This slip frequency output is impressed upon T-connected transformer 92 whereby it is converted to quarter-phase alternating potential proportional to the difference between the frequency of the alternating current supply frequency and the frequency of the alternating current potential impressed on the windings of dynamo-electric machine 11. In order to obtain an electrical quantity such as an alternating potential which varies in accordance with the speed of the machine 11 and yet still supplies a potential at standstill conditions of dynamo-electric machine 11, I superimpose the quarter phase slip frequency output of T-connected transformer 92 upon an alternating potential of primary frequency obtained from alternating current circuit 10 through the transformer 68, phase shifting transformer 93 and T-connected transformers 94 and 95. By this arrangement a quarter phase alternating potential having beats is produced. This beat frequency is at all times equal to the frequency of rotation of dynamo-electric machine 11 and is rectified by means of rectifiers 96 and 97 the output of which is impressed across serially connected resistors 98 and 99, respectively, differentially arranged. The potential appearing across resistor 98 is a direct current potential having the wave shape of the envelope of the beat cycle. The potential across resistor 99 is similar although displaced by 90 electrical degrees in phase. Since these resistors are differentially arranged an alternating potential of the beat frequency or of a frequency equal to the speed of dynamo-electric machine 11 is obtained across resistors 98 and 99 which is impressed on the saturating windings 74 associated with the excitation circuits 61—64 controlling the energy supplied to phase winding 13 of dynamo-electric machine 11. When the terminal 100 of resistor 98 is positive relative to terminal 101 a current will flow through unilaterally conductive device 84 aiding the saturating current from potentiometer 80, but unilaterally conductive device 83 prevents this current from flowing therethrough and this potential obtained across terminals 100—101 is such as to counteract the direct current potential obtained from potentiometer 80 and hence remove the saturation of transformers 61 and 62 by virtue of direct current from potentiometer 80 whereby the rectifier peaks are no longer wiped out and valves 22 and 23 may transmit current in one direction through phase winding 13. One hundred and eighty electrical degrees later with reference to the rotational frequency of dynamo-electric machine 11 terminal 101 of resistance 99 is positive relative to terminal 100 of resistance 98 and the rectifier excitation peaks on grids 28 of electric discharge valves 24 and 25 are allowed to become effective while those of valves 22 and 23 are again held off or removed by saturating windings 74 of control transformers 61 and 62. Similarly, the output of T-connected transformer 95 is rectified by rectifiers 102 and 103 and impressed upon serially connected resistors 104 and 105 having terminals 106 and 107. An alternating potential having a frequency equal to the rotational frequency of dynamo-electric machine 11 is obtained across terminals 106 and 107 and impressed on the saturating windings 74 of control transformers 57—60 periodically to allow the rectifier peaks to become effective on the control electrodes 28 of electric discharge valves 18—21. Phase shifting transformer 93 provides an adjustment for controlling the instant at which the rectifier excitation is allowed to become effective and is analogous to the brush shifting arrangements on the mechanical distributors of the prior art.

In explaining the operation of the electric valve converting system illustrated in Fig. 1, the operation of magnetic commutator 88 will first be described by reference to the curves shown in Fig. 2. When dynamo-electric machine 11 is at standstill the alternating potential impressed upon stator winding 91 of pilot generator 89 is induced by transformer action in rotor winding 90. Therefore, the output of transformer 92 is a quarter-phase output of the same frequency as is impressed across the primary windings of transformers 94 and 95 and by suitably adjusting phase shifter 93 the voltages may be superimposed in such a manner that no voltage occurs across resistor 98, for example, while a direct current voltage occurs across resistor 99. By virtue of rectifiers 102 and 103 the same will be true across resistors 104 and 105 although the maximum point of the direct current potentials across resistors 104 and 105 occurs 90 electrical degrees out of phase with respect to the maximum of the direct current potential across resistors 98 and 99. As dynamo-electric machine 11 begins to rotate the frequency appearing across transformer 92 decreases and the superimposed alternating potentials of beat frequency are impressed across rectifiers 96 and 97. The curve A in Fig. 2 represents the resultant alternating potential obtained by superimposing the outputs of transformers 92 and 94 for one particular speed of motor 11 which is impressed on rectifier 96 while the curve B represents the resultant of the superimposed alternating potential waves impressed on rectifier 97. The output of rectifier 96 for the particular speed of motor 11 mentioned above then becomes a pulsating direct current potential C which is the envelope of the beat cycle and appears as a pulsating direct current potential across resistor 98. The output of rectifier 97 appearing across resistor 99 is also a pulsating direct current potential D which is also the envelope of the beat cycle but displaced in phase from C by 90 electrical degrees. Since resistors 98 and 99 are differentially connected the potential appearing across terminals 100 and 101 is the difference of the potentials appearing across resistors 98 and 99, respectively, or the difference between curves C and D, and is an alternating potential of the beat frequency, that is, having one complete cycle for each beat cycle. This alternating potential appearing across terminals 100 and 101 is illustrated by the curve E in Fig. 2. It will of course be understood that the frequency of curve E is the frequency of rotation of dynamo-electric machine 11. At standstill the frequency is zero, or in other words, a direct current potential is obtained across the terminals 100 and 101, while at synchronous speed the potential across terminals 100 and 101 is zero. An alternating potential having a frequency equal to the frequency of rotation of dynamo-electric machine 11 is also obtained across the terminals 106 and 107 of serially connected resistors 104 and 105, which potential is displaced in phase by 90 electrical degrees from the potential obtained across terminals 100 and 101 so that control of the quarter-phase dynamo-electric machine 11 may be obtained.

It will be assumed now that dynamo-electric machine 11 is at standstill and that the switches 76, 77, 81, 82 and 87 are in their closed positions so that the cores of control transformers 57-64 are saturated by virtue of the direct current from source 85. If now alternating current circuit 10 is energized and the phase shifter 93 is adjusted so that the potentials superimposed and appearing at the output of transformer 94 are exactly in phase and equal in magnitude, the potential across resistor 98, for example, will be zero while the potential across resistor 99 will be a direct current potential. It will be assumed that potentiometers 75 and 80 as well as resistor 86 have been adjusted so that the direct current potential obtained across terminals 100 and 101 will be sufficient to overcome the direct current potential causing saturation of the cores of transformers 61 and 62, whereby the rectifier excitation peaks of the electric discharge valves 22 and 23 are allowed to become effective and energy is transferred from alternating current circuit 10 to phase winding 13 thereby causing rotation of dynamo-electric machine 11. As dynamo-electric machine 11 begins to accelerate a very low frequency will be obtained across the terminals 106 and 107 overcoming the saturation caused by the direct current flowing in windings 74 and thereby allowing the rectifier excitation of transformers 57 and 58 to become effective. Electric discharge valves 18 and 19, therefore, will allow energy to be transmitted to phase winding 12, the particular valve 18 or 19 which is conductive depending upon the portion of the cycle of the alternating potential from alternating current circuit 10 since these valves are energized so as to become conductive 180 degrees out of phase with one another. If the speed of dynamo-electric machine 11 increases the alternating potentials of the frequency of rotation of dynamo-electric machine 11 occurring across terminals 100—101 and 106—107 allow the rectifier peaks impressed upon the control electrode 28 of the various discharge valves 18-25 periodically to become effective in the proper sequence so that a variable frequency alternating potential may be supplied to phase windings 12 and 13 of dynamo-electric machine 11.

Speed control of dynamo-electric machine 11 may be obtained by the adjustment of rotary phase shifting devices 67 and 72.

My magnetic commutator and electric valve converting system is also applicable for use in connection with the induction type of dynamo-electric machines whereby speed control from subsynchronous speed to oversynchronous speed may be obtained.

In Fig. 3 I have illustrated an electric valve converting apparatus for supplying energy to a variable speed induction motor 111 having a stator winding 112 energized from a three-phase alternating current source 110 through a three-pole switching means 113. The armature of the dynamo-electric machine 111 is illustrated as comprising quarter-phase windings 114, 115. It will be understood by those skilled in the art that in the case of an induction motor at subsynchronous speeds energy will be taken from phase windings 114, 115 and returned to three-phase alternating supply circuit 110 by means of the electric valve converting apparatus while at or above synchronous speed energy will be supplied from alternating current circuit 110 through the electric valve converting apparatus to phase windings 114 and 115. The electric valve converting apparatus and control circuits therefor illustrated in Fig. 3 are in most respects identical with those illustrated in Fig. 1 and the corresponding parts are indicated by the same reference numerals. Potentiometers 75 and 80 for supplying direct current to saturating windings 74 of grid transformers 57-64, respectively, are energized with direct current from suitable direct current generators 116 and 117, respectively, the generators being driven by electric motors 118 and 119, respectively, energized with alternating current from alternating current source 110 through transformer 68.

The magnetic commutator 120 provided for the induction type dynamo-electric machine 111 of Fig. 3 must function differently in certain respects than the magnetic commutator of Fig. 1, as will be understood by those skilled in the art. This magnetic commutator must control the effectiveness of the rectifier excitation relative to the slip frequency of dynamo-electric machine 111 as contrasted with Fig. 1 where control in accordance with rotational frequency was provided. In order to obtain an electrical quantity proportional to the slip frequency of dynamo-electric machine 111 I provide a pilot generator 121, the rotor winding of which is directly coupled to and driven by dynamo-electric machine 111. Pilot generator 121 is preferably a variable speed polyphase alternating current commutating motor of the type described and broadly claimed in United States Letters Patent Reissue 14,031, granted December 14, 1915, upon an application of H. K. Schrage. This polyphase commutator pilot generator comprises a rotor winding 122 supplied with three-phase alternating current through rotary phase shifting transformer 123 and transformer 68 from alternating current source 110. In addition to primary winding 122 pilot generator 121 also comprises secondary windings 124, 125, 126 and 127, respectively, and adjusting winding 128. Quarter-phase slip frequency alternating potentials are obtained from pilot generator 121 across terminals 129, 130 and 131, 132, respectively. It will be understood that at standstill conditions of dynamo-electric machine 111 the alternating potential obtained across terminals 129, 130 and 131, 132, are of the frequency of alternating current supply circuit 110 while when dynamo-electric machine 111 is rotating at synchronous speed a direct current potential will be obtained across these respective terminals. Above synchronous speed, of course, the phase of the alternating potentials of slip frequency will be displaced in phase by 180 degrees as compared with these potentials at subsynchronous speeds. The operation of the electric valve converting system will be substantially the same as that described for Fig. 1 and will be well understood by those skilled in the art. When dynamo-electric machine 111 is started from standstill switch 113 is moved to the closed position and electric discharge valves 18-25 operate sequentially as inverters to transfer electrical energy induced in phase windings 114 and 115 back to alternating current supply line 110. Below synchronous speeds speed control may be obtained by virtue of contact making mechanisms 31 to 34, inclusive, the higher speed being obtained by decreasing the counter electromotive force against which the electric discharge valves 18-25 must operate as inverters. This is obtained by moving the contact making mechanisms 31-34 as near to the center of the respective windings 29 and 30 as possible. Speed control as well as power factor control may also be obtained by suitably adjusting phase shifting transformers 67 and 72. From zero speed up to some speed below synchronism magnetic commutator 120 is not essential except as regards the transfer of the wattless energy component since the electric discharge valves 18 to 25 operate as inverters and in view of the voltage conditions would not operate as rectifiers even if the rectifier excitation were allowed to become effective by virtue of magnetic commutator 120. However, if synchronous speed is approached electric discharge valves 18-25 begin to act as rectifiers supplying a certain amount of energy from alternating current circuit 110 to phase windings 114 and 115 and as the slip frequency decreases on approaching synchronous speed a low frequency alternating current component from magnetic commutator 120 periodically allows the rectifier excitation to become effective upon the control electrodes of the respective discharge valves in proper sequence. When synchronous speed is attained direct current components of control potential are obtained from magnetic commutator 120 so that the phase windings 114, 115 are energized with direct current through electric discharge valves 18-25. Above synchronous speed the components of control potential obtained from magnetic commutator 120 causes the apparatus to function in identically the same manner as the synchronous type dynamo-electric machine 11 described in connection with Fig. 1.

In Fig. 4 I have illustrated only a portion of the electric valve converting apparatus shown in Fig. 3 wherein the magnetic commutator 120 has been replaced by the same type of magnetic commutator 88 illustrated in Fig. 1. Furthermore, instead of direct current generators 116 and 117 for supplying the direct current for saturating windings 74 I provide the same source of supply 85 as illustrated in Fig. 1, the corresponding parts being indicated by the same reference numerals. However, in this case, the stator winding 91 of the pilot generator 89 is energized with direct current as contrasted with Fig. 1 where an alternating current was supplied thereto. By energizing the stator of pilot generator with direct current an alternating potential will be obtained across the terminals of resistors 98, 99 and 104, 105, respectively, which is proportional to slip frequency rather than the rotational frequency as in the case of the synchronous motor type of dynamo-electric machine 11 illustrated in Fig. 1. Commutator 88 of Fig. 4 operates identically insofar as output control potentials are concerned, as commutator 120 illustrated in Fig. 3 and its operation will be well understood by those skilled in the art in view of the detailed description included above.

While I have described certain particular embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a second alternating current circuit, electric translating apparatus connected between said circuits for transmitting power therebetween and comprising a plurality of electric valve means each having a control member for controlling the conductivity thereof, an excitation circuit for energizing said control members comprising means for impressing both a rectifier and an inverter component of excitation on said control members to excite said valve means for both rectifier and inverter operation with respect to said first mentioned circuit, means for normally maintaining said rectifier excitation ineffective, and means for periodically allowing said rectifier excitation to become effective at the periodicity of said second mentioned circuit to render said electric valve means conductive in a predetermined order to effect transfer of power between said first mentioned and said second alternating current circuit.

2. In combination, an alternating current supply circuit, a variable frequency alternating current load circuit, electric translating apparatus connected between said circuits for transmitting power therebetween and comprising a plurality of electric valve means each having a control member for controlling the conductivity thereof, an excitation circuit for energizing said control members comprising means for impressing both a rectifier and an inverter component of excitation on said control members to excite said valve means for both rectifier and inverter operation with respect to said supply circuit, means for normally removing said rectifier excitation and means comprising a magnetic commutator for periodically allowing said rectifier excitation to become effective at the periodicity of said load circuit to render said electric valve means conductive in a predetermined order to effect transfer of power between said supply and load circuits.

3. In combination, an alternating current circuit, a second alternating current circuit, electric translating apparatus connected between said circuits for transmitting power therebetween and comprising a plurality of electric valve means each having a control member for controlling the conductivity thereof, an excitation circuit for energizing said control members comprising means for impressing both a rectifier and an inverter component of excitation on said control members to excite said electric valve means for both rectifier and inverter operation with respect to said supply circuit, means for normally maintaining said rectifier excitation ineffective, means for producing a periodic voltage which varies in accordance with an electrical condition of one of said circuits, means for producing a second periodic voltage the frequency of which varies in accordance with a controlling influence derived from the other of said circuits, and means responsive to a periodic voltage of beat frequency produced by said periodic voltages for allowing said rectifier excitation to become effective at the periodicity of said second mentioned alternating current circuit to render said electric valve means conductive in a predetermined order to effect transfer of power between said first mentioned and said second alternating current circuits.

4. In combination, an alternating current circuit, a second alternating current circuit, electric translating apparatus connected between said circuits for transmitting power therebetween and comprising a plurality of electric valve means each having a control member for controlling the conductivity thereof, an excitation circuit for energizing said control members comprising means for impressing both a rectifier and an inverter component of excitation on said control members to excite said valve means for both rectifier and inverter operation with respect to said supply circuit, means for normally maintaining said rectifier excitation ineffective and means for producing a beat frequency alternating current potential modulated in accordance with the voltage of said second alternating current circuit for periodically allowing said rectifier excitation to become effective to render said electric valve means conductive in a predetermined order to effect transfer of power between said first mentioned and said second alternating current circuits.

5. In an electric valve converting system, an alternating current supply circuit, a variable frequency alternating current load circuit, translating apparatus connected between said circuits for transmitting power therebetween and comprising a plurality of electric valve means each having a control member for controlling the conductivity thereof and an excitation circuit for energizing said control member comprising means for successively exciting said control members for rectifier operation at the periodicity of said alternating current supply circuit, means for normally maintaining said rectifier excitation ineffective and means comprising a magnetic commutator for allowing the rectifier excitation to become effective periodically at the frequency of said load circuit.

6. In an electric valve converting system comprising a supply circuit, a load circuit, means including a plurality of electric valves for transmitting energy therebetween, each of said valves being provided with a control electrode, excitation apparatus for said electrodes comprising a control circuit for each of said valves including a saturable core transformer winding, means for exciting the transformer winding with an alternating potential of the frequency of said first mentioned alternating current circuit, means for normally saturating the cores of said transformer windings to nullify the excitation of said transformer windings, and means responsive to the frequency of said second mentioned alternating current circuit for overcoming the saturation of the cores of said transformer windings to allow said excitation current to become effective thereby rendering said electric valve means conductive in a predetermined order to effect a transfer of power between said first mentioned and said second alternating current circuits.

7. In an electric valve converting system, an alternating current circuit, a second alternating current circuit, electric translating apparatus connected between said circuits for transmitting power therebetween and comprising a plurality of electric valve means each having a control member for controlling the conductivity thereof, excitation apparatus for said control electrodes comprising means for impressing upon said electrodes an alternating potential of the frequency of said first mentioned alternating current circuit and of peaked wave form to excite said valve means for inverter operation, a saturable core transformer winding included in the circuit of the control electrode of each of said valve means, means for inducing in said transformer winding an alternating potential of the frequency of said first mentioned alternating current circuit for exciting said valve means for rectifier operation and a saturating winding for each of said transformer cores connected to carry a direct current for normally removing the rectifier excitation from said control electrodes, and means for periodically allowing said rectifier excitation to become effective at the periodicity of said second mentioned alternating current circuit to render said electric valve means conductive in a predetermined order to effect transfer of power between said first mentioned and said second alternating current circuits.

8. An electric valve converting system comprising an alternating current circuit, a second alternating current circuit, means including a plurality of groups of electric valves for transmitting energy therebetween, means for exciting said groups of valves for inverter operation to transmit energy from said second alternating current circuit to said first mentioned alternating current circuit, means for simultaneously exciting said groups of valves for rectifier operation, means continuously tending to remove the rectifier excitation from said groups of valves, and means responsive to the frequency of said second mentioned alternating current circuit for periodically and successively allowing the rectifier excitation to become effective to render said groups of valves conductive in a predetermined order to effect transfer of power between said first mentioned and said second alternating current circuits.

9. In an electric valve converting system comprising an alternating current supply circuit, a variable frequency alternating current load circuit, means including a plurality of groups of electric valves for transmitting energy therebetween, each of said valves being provided with a control electrode, excitation apparatus for said electrodes comprising means for energizing said control electrodes with a component of said alternating current supply circuit of peaked wave for normally exciting said valves for inverter operation, a saturable core transformer winding included in the circuit of the control electrode of each of said valves, means for inducing in said transformer winding an alternating potential of the frequency of said supply circuit for exciting said valves for rectifier operation, saturating windings for said transformer cores, means for continuously exciting said saturating windings with direct current to remove the rectifier excitation from said control electrodes, and means responsive to the frequency of said alternating current load circuit for producing a potential for periodically overcoming said saturating means and allowing said rectifier excitation to become effective at the periodicity of said alternating current load circuit thereby rendering said electric valves conductive in a predetermined order to effect the transfer of power between said supply and load circuits.

10. In combination, an alternating current circuit, a second alternating current circuit, electric translating apparatus connected between said circuits for transmitting power therebetween and comprising a plurality of electric valve means each having a control member for controlling the conductivity thereof, and an excitation system for energizing the control member comprising means for impressing on the control members a plurality of periodic voltages of a periodicity corresponding to that of said first mentioned circuit to excite said valves for both rectifier and inverter operation with respect to said first mentioned circuit, means for normally maintaining one of said periodic voltages ineffective and means for periodically allowing said periodic voltage to become effective at the periodicity of said second mentioned circuit to render said electric valve means conductive in a predetermined order to effect a transfer of power between said first mentioned and said second alternating current circuits.

11. In combination, an alternating current supply circuit, a dynamo-electric machine, electric translating apparatus connected between said alternating current circuit and said dynamo-electric machine for transmitting power therebetween and comprising a plurality of electric valve means each having a control member for controlling the conductivity thereof, and an excitation system for energizing the control member comprising means for impressing on the control member a plurality of periodic voltages of a periodicity corresponding to that of said alternating current circuit, means for normally maintaining one of said periodic voltages ineffective and means for generating a voltage having the rotational frequency of said dynamo-electric machine to periodically overcome said last mentioned means to render said electric valve means conductive in a predetermined order to effect transfer of power between said alternating current circuit and said dynamo-electric machine.

12. In an electric valve converting system, an alternating current circuit, a dynamo-electric machine provided with a plurality of phase windings, electric translating apparatus connected between said alternating current circuit and said phase windings for transmitting power therebetween and comprising a plurality of electric valve means each having a control member for controlling the conductivity thereof, an excitation circuit for energizing the control member comprising means for impressing on the control member a plurality of periodic voltages of a periodicity corresponding to that of said alternating current circuit, means for normally maintaining one of said periodic voltages ineffective, a pilot generator driven by said dynamo-electric machine for producing a periodic voltage which varies in accordance with an electrical condition of said dynamo-electric machine, means for superimposing the potential produced by said pilot generator upon a potential obtained from said alternating current circuit to produce a periodic voltage of beat frequency, means for converting said periodic voltage of beat frequency into a periodic voltage of the rotational frequency of said dynamo-electric machine for causing said normally ineffective periodic voltage of said excitation circuit to become effective to render said electric valve means conductive in a predetermined order thereby to effect the transfer of power between said alternating current circuit and said dynamo-electric machine.

13. In combination, a supply circuit, an alternating current dynamo-electric machine, electric translating apparatus connected between said supply circuit and said dynamo-electric machine for transmitting power therebetween and comprising an electric valve frequency changer including a plurality of electric valve means each having a control member for controlling the conductivity thereof, an excitation system for energizing said control member including a second dynamo-electric machine having a winding energized from said supply circuit and a rotatable element driven by a rotatable element of said first dynamo-electric machine for producing a control potential having a frequency equal to the beat frequency of said supply frequency and the rotational frequency of said first mentioned dynamo-electric machine to control the operation of said electric valve frequency changer in accordance with an operating condition of said machine.

SAMUEL P. NIXDORFF.